Figure 4:
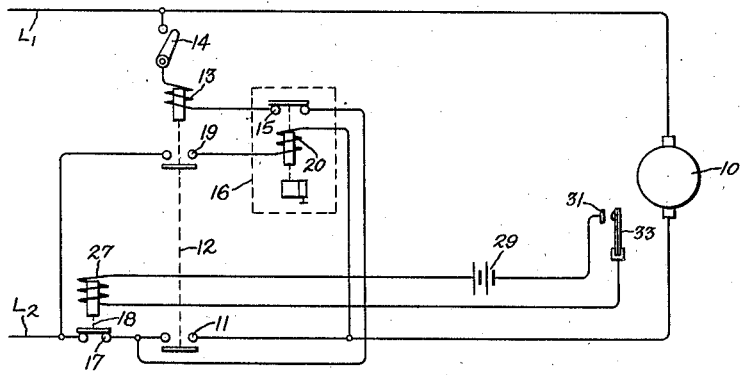

May 19, 1942.  E. J. SCHAEFER  2,283,700
PROTECTIVE SYSTEM
Filed Nov. 29, 1940  2 Sheets-Sheet 1
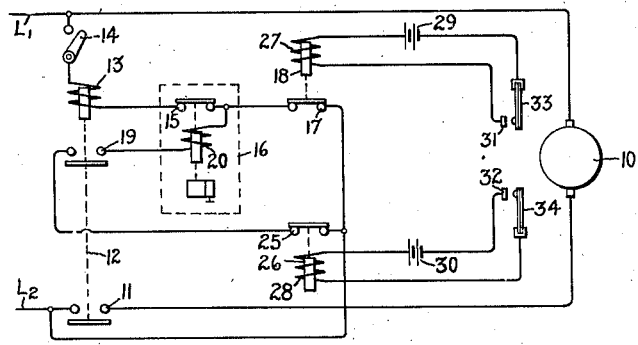
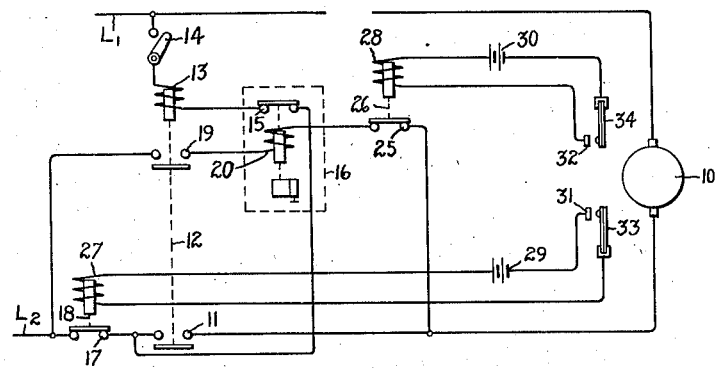
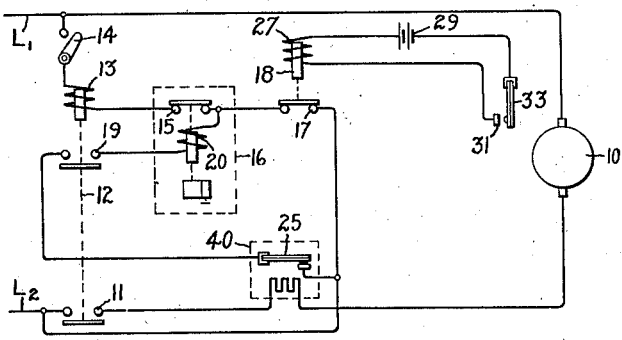
Inventor:
Edward J. Schaefer,
by Harry E. Dunham
His Attorney.

May 19, 1942.  E. J. SCHAEFER  2,283,700
PROTECTIVE SYSTEM
Filed Nov. 29, 1940   2 Sheets-Sheet 2

Inventor:
Edward J. Schaefer,
by Harry E. Dunham
His Attorney.

Patented May 19, 1942

2,283,700

UNITED STATES PATENT OFFICE 2,283,700

PROTECTIVE SYSTEM

Edward J. Schaefer, Fort Wayne, Ind., assignor to General Electric Company, a corporation of New York Application November 29, 1940, Serial No. 367,791

16 Claims. (Cl. 175—294)

My invention relates to overload protective systems, and particularly to overload protective arrangements having a time delay characteristic for relatively small overloads and an instantaneous characteristic upon the occurrence of a predetermined relatively large overload.

It is well understood by those skilled in the art that electrical insulation, such as that used to protect the windings of electric motors, is capable of withstanding a higher temperature for a short period of time than would be permissible for a longer period. The inverse time-current characteristic of many well-known overload protective systems provides protection which may be adjusted to give suitable response over certain ranges of overload values. It has been found, however, that optimum use of materials is not always obtainable under the control of an inverse time-current characteristic overload device. For example, if such a device is set to permit a relatively high overload to persist for a desired time, it will often permit the persistance of a relatively low overload for a longer time than is desired. On the other hand, if such a device is adjusted to permit the persistance of a relatively low overload for the desired period, it is found that it will remove a relatively high overload in a shorter time than is necessary. Furthermore, a simple time element device of this character requires a minimum time of appreciable length for the removal of equipment from a line regardless of the magnitude of an overload.

The limitations of the inverse time-current characteristic type of overload device may be overcome by selecting a certain range of overload values within which the protected equipment will be allowed to remain on the line for a certain predetermined time regardless of the magnitude of an overload falling within the range, while also providing means for removing the equipment from the line substantially instantaneously upon the occurrence of an overload of a predetermined maximum magnitude. In some instances it is also desirable to provide inverse time delay characteristics for overloads falling within the selected range with or without superimposed instantaneous protection upon the occurrence of an overload of a predetermined maximum value.

Accordingly, it is an object of my invention to provide an electrical overload protective system which will permit the protected equipment to carry small overloads within a predetermined range for a predetermined length of time but which will operate substantially instantaneously upon the occurrence of an overload of a predetermined maximum magnitude.

It is a further object of my invention to provide an overload protective system which will maintain service upon the occurrence of overloads within a predetermined range of values for a period of time dependent upon the magnitude of the overload within the range, but which will operate substantially instantaneously upon the occurrence of an overload of a predetermined maximum value.

Accordingly, my protective system includes two load responsive devices, one of which is set for a relatively low overload response and operates to energize a time delay relay arranged to remove the protected equipment from the line after the lapse of a predetermined interval of time, and the other of which will remove the equipment from the line substantially instantaneously upon the occurrence of a predetermind maximum overload at any time after the operation of the first load responsive device.

For a more complete understanding of my invention, reference should now be had to the accompanying drawings wherein I have shown in Fig. 1 a simplified circuit diagram of a protective system embodying my invention, and in Figs. 2 and 3 simplified circuit diagrams of overload protective systems embodying my invention in modified forms.

Referring now to Fig. 1, I have shown a load device such as a motor 10 connected across a source of electric supply $L_1$, $L_2$ through the contacts 11 of a line contactor 12. An energizing circuit for the operating coil 13 of the line contactor 12 may be completed through the control switch 14, the contacts 15 of a time delay relay 16, and the contacts 17 of an overload relay 18. The line contactor 12 is provided with a pair of interlock contacts 19 through which an energizing circuit for the operating coil 20 of the time delay relay 16 may be completed. This circuit may be traced from the line $L_1$ through the control switch 14, the operating coil 13, the contacts 15 of the time delay relay, the operating coil 20 of the time delay relay, the interlock contacts 19 of the line contactor 12, and a pair of contacts 25 of an overload relay 26 to the line $L_2$.

The overload relays 18 and 26 are provided with operating coils 27 and 28 respectively energized respectively from sources of supply, such as the batteries 29 and 30, through the thermally operated contacts 31 and 32 of a pair of temperature responsive devices 33, 34 respectively.

The temperature responsive devices 33 and 34 are preferably disposed in intimate heat conductive relationship with the windings of the motor 10 to be protected. The devices 33 and 34 may be of any suitable type, for example, their contacts may be actuated by bimetallic strips or by the expansion of liquid or gases. According to my invention the device 33, shown in Fig. 1 as a bimetallic strip, is adjusted to close its contacts 31 at a predetermined relatively low temperature, while the load responsive device 34, also shown as a bimetallic strip in Fig. 1, is adjusted to close its contacts at a predetermined relatively high temperature. The temperature at which the bimetallic strip 33 will operate to close its contacts is preferably of such magnitude that the motor 10 can withstand it for a period of time without undesirable deterioration. The temperature at which the bimetallic strip 34 is adjusted to close its contacts is preferably such that it demands immediate disconnection of the motor 10 from the line. When the temperature settings of the devices 33 and 34 have been chosen as described, the time delay of the relay 16 should be adjusted for whatever period the motor 10 can safely withstand any temperature between the settings of the devices 33 and 34.

In the operation of the arrangement shown in Fig. 1 the motor 10 may be started by closing the control switch 14. The closing of this switch completes an energizing circuit previously traced for the operating coil 13 of the line contactor 12, causing this contactor to pick up and close its contacts 11. When the line contactor 12 picks up it closes its interlock contacts 19 to complete a circuit through the operating coil 20 of the time delay relay 16. It will be observed, however, that the operating coil 20 is normally short circuited through the contacts 17 of the overload relay 18. If now the temperature of the windings of the motor 10 becomes sufficiently high to cause the temperature responsive device 33 to close its contacts 31, the operating coil 27 will pick up the overload relay 18. When the relay 18 opens its contacts 17 it breaks a shunt circuit around the operating coil 20 of the time delay relay 16 and thereby inserts the coil 20 and the contacts 15 of the time delay relay, into the circuit of the operating coil 13 of the line contactor 12. The consequent decrease in current through the coil 13 is not sufficient to cause the contactor 12 to drop out. The time delay relay 16, now being set into operation, will open its contacts 15 after the lapse of a predetermined time and thus interrupt the energizing circuit for the coil 13 of the line contactor 12. If, however, before this predetermined time has elapsed, the temperature of the motor windings reaches a value sufficient to cause the temperature responsive device 34 to close its contacts 32, the overload relay 26 will pick up to open its contacts 25. The opening of the contacts 25 will disable the operating coil 13 independently of the contacts 15 of the time delay relay 16. The opening of the contacts 25 of the overload relay 26 has no effect upon the circuit unless the contacts 17 of the overload relay 18 are first opened. It will be quite apparent, however, that the contacts 17 will always open before the contacts 25 because of the fact that the temperature responsive device 33 is set for operation at a lower temperature than the device 34.

In Fig. 2 I have shown a modified form of my invention in which the elements corresponding to those of Fig. 1 have been assigned like reference numerals. In the form of my invention disclosed in Fig. 2 the line current is passed through the operating coil 20 of the time delay relay 16. Referring now to Fig. 2, the energizing circuit for the coil 13 will be seen to include the control switch 14, the contacts 15 of the time delay relay 16 and the contacts 17 of the overload relay 18. The contacts 17 of the overload relay 18 are also in series with the contacts 11 of the line contactor 12 in the motor circuit. When the line contactor 12 is picked up the operating coil 20 of the time delay relay 16 is connected across the contacts 11 and 17 through the interlock contacts 19 of the line breaker 12 and the contacts 25 of the overload relay 26. Since neither of the overload relays 18 or 26 is normally energized, however, the operating coil 20 of the time delay relay 16 is effectively short circuited. If now the temperature of the windings of the motor 10 reaches the low setting of the temperature responsive device 33 the overload relay 18 will open its contacts 17 and insert the operating coil 20 of the time delay relay 16 into the motor circuit. When the contacts 17 open the coil 13 is not disabled, for its energizing circuit, instead of passing through the contacts 17 to L₂, passes through the contacts 11, the contacts 25, the coil 20 and the contacts 19 to L₂. With the time delay relay thus energized it will open its contacts 15 after the lapse of a predetermined time to disable the energizing circuit for the operating coil 13 of the line contactor 12 thereby to open the motor circuit at the line breaker contact 19. If, however, before the lapse of this predetermined time the windings of the motor 10 reach the temperature at which the device 34 is set to operate, the overload relay 26 will open its contacts 25 thus breaking the motor circuit directly at the contacts 25. The contacts 25 simultaneously disable the coil 13 and the line contactor 12 drops out.

According to the modification of Fig. 2 described above the value of current carried by the operating winding 20 of the time delay relay 16 is dependent upon the magnitude of the overload within the range determined by the settings of the devices 33 and 34. Thus, if the time delay relay 16 is one having an inverse time-current characteristic the desirable features of inverse time protection may be combined with my invention. As shown in Fig. 4, this latter feature alone may be depended upon to provide the high overload protection. Such an arrangement dispenses with the need for the temperature responsive device 34 of Fig. 2. Fig. 4 therefore is similar to Fig. 2 except that the device 34 and its associated relay 26 has been omitted. In operation, the time delay relay 16 of Fig. 4 acts as a high overload trip with an inverse time-current characteristic, since the operating coil 20 of the relay 16 carries line current after the device 33 has operated.

Figure 5:
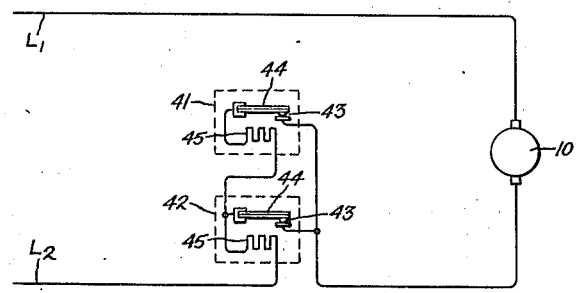

As further illustrated in Fig. 5, the principle of Fig. 4 may be used to provide a very simple and efficient arrangement in applications where the motor 10 is small enough to be operated directly from the contacts of an overload device. According to Fig. 5 the motor 10 is connected to the line through two current sensitive devices 41 and 42 in parallel. Each device 41 and 42 comprises a pair of contacts 43, a bimetallic strip 44 and a heater 45. The device 41 is set to open its contacts at the desired low overload and thereby transfer the entire load to the device 42. The device 42 is so calibrated that it will not allow the motor 10 to operate continuously on any current greater than that necessary to trip the device 41. With such calibration the device 42 will open the motor circuit with an inverse time-current characteristic after the operation of the device 41 in the event that the relatively low overload which produced operation of the device 41 persists. If, on the other hand, a relatively large overload occurs, the device 42 will operate as a second overload device substantially instantaneously to disable the motor circuit after operation of the device 41.

It will be obvious that the arrangement of Fig. 5 may be further modified by using a temperature responsive device in place of the current responsive device 41. Since the inverse time-current characteristic of the device 42 is essential, however, that device must be current responsive.

In Fig. 3 I have shown a modification of my invention in which a current responsive device 40 having contacts 25 is used for high overload protection in place of the temperature responsive device 34 of Figs. 1 and 2. With the exception of the device 40 the modification of Fig. 3 is similar to that of Fig. 1. Corresponding parts have been assigned like reference numerals and it is believed that the operation of the arrangement shown in Fig. 3 will be obvious.

I wish to have it understood, of course, that I do not wish to be limited to the particular modifications which I have shown and described, but that, for example, the time delay relay 16 may be of any desired type, such as thermal or magnetic. Furthermore, either or both of the load responsive devices 33 and 34 of Fig. 1 may suitably be either temperature responsive as shown in Fig. 1 or current responsive as shown at 40 in Fig. 3.

Therefore, while I have shown particular modifications of my invention, it will be understood by those skilled in the art that I do not wish to be limited thereto; and I therefore intend, by the appended claims, to cover all such modifications as fall within the true spirit and scope of my invention.

What I claim as new and desire to secure by Letters Patent of the United States is:

1. An overload protective system comprising in combination, an electrical load device, switching means for connecting said load device to a source of electric energy, time element means, first load responsive means, said time element means and said first load responsive means being operable independently to disable said switching means, and second load responsive means arranged normally to disable said time element means.

2. An overload protective system comprising in combination, an electrical load device, switching means for connecting said load device to a source of electric energy, time element means for disabling said switching means, first load responsive means normally disabling said time element means, and second load responsive means operable in conjunction with said first load responsive means to disable said time element means and said switching means.

3. An overload protective system comprising in combination an electrical load device, switching means for connecting said load device to a source of electric supply, time element means having contacts operable to disable said switching means, a first load responsive device having contacts normally disabling said time element means, and a second load responsive device operable in conjunction with said first load responsive device to disable said switching means independently of said time element means.

4. An overload protective system comprising in combination an electrical load device, switching means for connecting said load device to a source of electric energy, a time delay relay having contacts operable to disable said switching means, a first load responsive device having contacts normally disabling said time delay relay, and a second load responsive device operable to disable said switching means and said time delay relay.

5. An overload protective system comprising in combination, an electrical load device, switching means for connecting said load device to a source of electric supply, operating means for said switching means, a time delay relay having contacts in series circuit relation with said operating means, an operating coil for said time delay relay, first load responsive means normally completing a shunt circuit around said operating coil, and second load responsive means operable in conjunction with said first load responsive means to disable said switching means independently of said time delay relay.

6. An overload protective system comprising in combination an electrical load device, switching means for connecting said load device to a source of electric supply, time element means for disabling said switching means, temperature responsive means normally disabling said time element means, and second temperature responsive means operable in conjunction with said first temperature responsive means to disable said switching means and said time element means.

7. An overload protective system comprising in combination an electrical load device, switching means for connecting said load device to a source of electric supply, time element means having contacts operable to disable said switching means, a first temperature responsive device having contacts normally disabling said time element means, and a second temperature responsive device operable in conjunction with said first temperature responsive device to disable said switching means independently of said time element means.

8. An overload protective system comprising in combination an electrical load device, switching means for connecting said load device to a source of electric supply, operating means for said switching means, a time delay relay having a pair of contacts in series circuit relation with said operating means, an operating coil for said time delay relay, a first temperature responsive device having a pair of contacts normally completing a shunt circuit around said operating coil, and a second temperature responsive means operable in conjunction with said first temperature responsive means to disable said operating means and said operating coil upon occurrence of an overload of a predetermined relatively high value.

9. An overload protective system comprising in combination an electrical load device, switching means for connecting said load device to a source of electric supply, a time delay relay having a pair of contacts operable to disable said switching means, a first load responsive device having a pair of contacts normally disabling said time delay relay, and a second load responsive device having a pair of contacts in series circuit with said time delay relay contacts.

10. An overload protective system comprising in combination an electrical load device, switching means for connecting said load device to a source of electric supply, operating means for said switching means, a time delay relay having a pair of contacts and an operating coil in series circuit relation with said operating means, a first load responsive device having a pair of contacts in series circuit with said operating means, and a second load responsive device having a pair of contacts normally completing a shunt circuit around said operating coil.

11. An overload protective system comprising in combination, an electrical load device, switching means for connecting said load device to a source of electric supply, operating means for said switching means, a time delay relay having a pair of contacts in series circuit relation with said operating means, an operating coil for said time delay relay, and a load responsive device having a pair of contacts in series circuit relation with said load device, said contacts of said load responsive device being arranged normally to complete a shunt circuit about said operating coil of said time delay relay and being operable upon the occurrence of a predetermined overload to connect said operating coil in series circuit relation with said load device.

12. An overload protective system comprising in combination, an electrical load device, switching means for connecting said load device to a source of electric supply, operating means for said switching means, a time delay relay having a pair of contacts and an operating coil in series circuit relation with said operating means, first temperature responsive means arranged in heat conductive relation with said load device, said temperature responsive means comprising a pair of contacts normally completing a shunt circuit around said operating coil, and second temperature responsive means in heat conductive relation to said load device, said second temperature responsive means comprising a pair of contacts in series circuit relation with said operating means and said operating coil.

13. An overload protective system comprising in combination, an electrical load device, an electric circuit for connecting said load device to a source of electric supply, time element means arranged to disable said circuit, first load responsive means having contacts normally closed to disable said time element means, said load responsive means being operable to open said contacts upon occurrence of a relatively low overload thereby to initiate operation of said time element means to disable said circuit, and second load responsive means operable in conjunction with said time element means to modify the operation of said time element means upon the occurrence of a predetermined relatively high overload.

14. An overload protective system comprising in combination, an electrical load device, an electric circuit for connecting said load device to a source of electric supply, time element means arranged to disable said circuit, load responsive means for disabling said circuit substantially instantaneously upon the occurrence of a predetermined relatively high overload, and second load responsive means having contacts normally closed to shunt said time element means, said second load responsive means being operable upon occurrence of a relatively low overload to separate said contacts thereby to initiate operation of said time element means.

15. An overload protective system comprising in combination an electrical load device, an electric circuit for connecting said load device to a source of electric supply, load responsive means for disabling said circuit upon the occurrence of an overload thereon, and time element means rendered effective by said load responsive means and operable in conjunction therewith to delay the disabling of said circuit when said overload is less than a predetermined value, said load responsive means being arranged to render said time element means substantially ineffective upon the occurrence of an overload greater than said predetermined value.

16. An overload protective system comprising in combination, an electrical load device, switching means for connecting said load device to a source of electric supply, operating means for said switching means, a time delay relay having a pair of contacts in series circuit relation with said operating means, an operating coil for said time delay relay, a first load responsive device having a pair of contacts in series circuit with said operating coil, and a second load responsive device having a pair of contacts in series circuit relation with said load device and normally completing a shunt circuit about said operating coil and said contacts of said first load responsive device, said second load responsive device being arranged to open its contacts upon the occurrence of a relatively low overload thereby to connect said time delay relay and said contacts of said first load responsive device in series circuit relation with said load device.

EDWARD J. SCHAEFER.